(No Model.) 2 Sheets—Sheet 1.
T. G. BARLOW-MASSICKS.
ORE SEPARATING APPARATUS.
No. 585,732. Patented July 6, 1897.
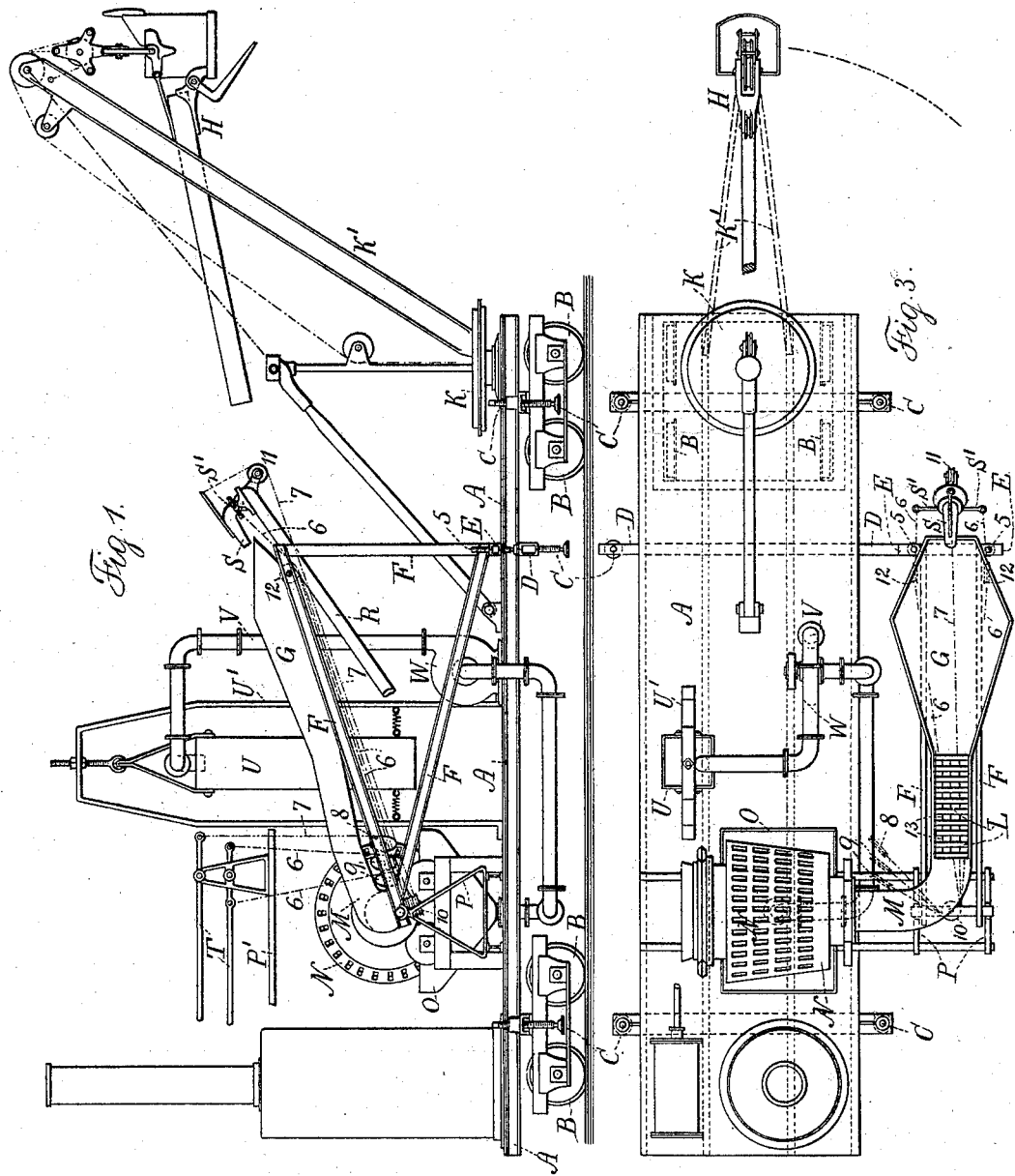
Witnesses:
J. Staib
Chas. H. Smith
Inventor:
T. G. Barlow-Massicks
per L. W. Serrell & Son
Attys (No Model.) 2 Sheets—Sheet 2.
T. G. BARLOW-MASSICKS.
ORE SEPARATING APPARATUS.
No. 585,732. Patented July 6, 1897.
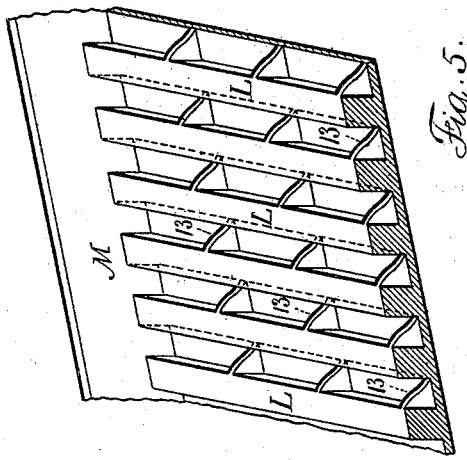
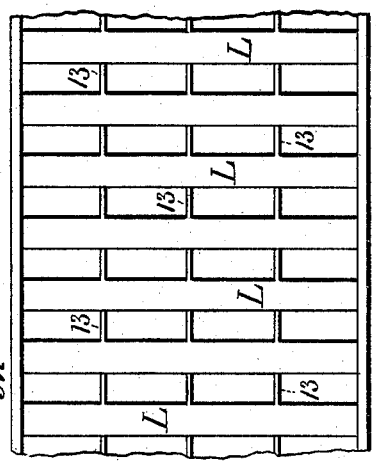
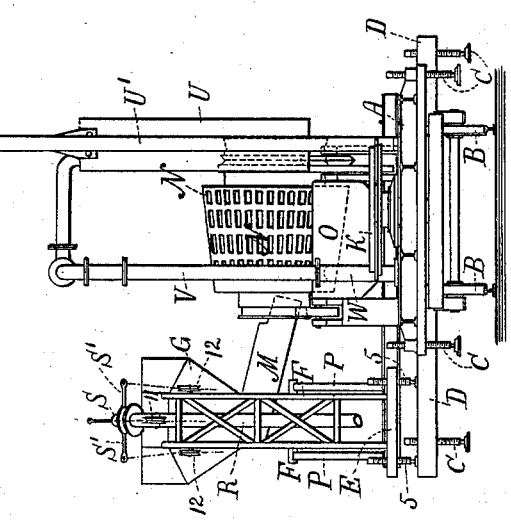
Witnesses:
J. Staib
Chas. H. Smith
Inventor:
T. G. Barlow-Massicks
per L. W. Serrell & Son
Attys

UNITED STATES PATENT OFFICE.

THOMAS G. BARLOW-MASSICKS, OF MASSICKS, ARIZONA TERRITORY.

ORE-SEPARATING APPARATUS.

SPECIFICATION forming part of Letters Patent No. 585,732, dated July 6, 1897.

Application filed July 16, 1896. Serial No. 599,356. (No model.)

*To all whom it may concern:*

Be it known that I, THOMAS G. BARLOW-MASSICKS, a subject of the Queen of Great Britain, residing at Massicks, in the county of Yavapai and Territory of Arizona, have invented an Improvement in Ore-Separating Apparatus, of which the following is a specification.

In mining operations a steam-shovel has been employed, the sand and gravel from the bucket being dumped into a hopper, and a stream of water has been directed upon the earthy materials to wash the same down into a revolving cylinder, but difficulty has been experienced in so washing the gravel into the cylinder that it separates to the best advantage, because sometimes the gravel will be carried down in a mass into such cylinder without being properly separated, and in addition to this it has been difficult to properly support the washing apparatus and to adjust the same for maintaining a substantially horizontal position for the platform, especially when such platform is mounted upon wheels supported by a track, because the apparatus has to be moved along from time to time as the steam-shovel is moved from place to place.

The object of the present invention is to support upon a platform the steam-shovel and the separating apparatus in such a manner that the parts can be held with the platform in a substantially level position. The action of the water upon the gravel as dumped into the hopper can be regulated by the attendant so as to cause a nearly uniform flow from the hopper over riffles and into the rotary washing-cylinder, and the inclination of the hopper-trough can be varied, and the riffles are constructed in such a manner that the mercury is not liable to be displaced or spilt by any jolting or oscillation that the apparatus receives while being moved from one place to another, and the apparatus is so arranged as to be exceedingly compact and easily controlled by the attendant.

In the drawings, Figure 1 is a side elevation. Fig. 2 is an end view. Fig. 3 is a plan, Fig. 4 a perspective view, and Fig. 5 a plan view on a larger scale, representing the riffles in the washing trunk or trough.

The platform A is of suitable size and supported by wheels B, preferably arranged as trucks, and the beams of the platform A extend over and are provided with jack-screws C, that may be screwed down upon blocks or chocks for steadying the apparatus when in use or for bringing the platform A level, or nearly so, especially transversely, and the cross-beams D of the platform extend out sufficiently far at one side to receive the base E and frame F, that carry the hopper G of the washing apparatus, and this frame F is advantageously triangular and substantially parallel to the central line of the car-platform A, and at the apex this frame F is supported upon the base or frame P by suitable trunnions, so that the opposite portion of the triangular frame F can be raised or lowered by screws 5, passing through the base E of such frame and resting upon the cross-beam D. This is especially advantageous for regulating the inclination of the hopper G and trunk M, so that the materials will run down the trunk with the desired speed, and the inclination can be maintained even when the trucks of the platform A are upon a railway that is inclined.

For the purposes of illustration a portion of a steam shovel or bucket is represented at H, with chains passing over sheaves for drawing up the bucket to fill the same, and the arm K' rises from a turn-table base K upon the platform A, there being a central vertical shaft supported at the upper end, so that the steam-shovel and its arm can be swung around when the shovel is loaded, and the gravel or other material in the shovel can be discharged into the hopper G by opening the bottom of the steam shovel, scoop, or bucket. As the devices for supporting and operating the steam-shovel are well known, it is only necessary to represent herein the general position of such steam-shovel in relation to the other parts of the present apparatus.

A nozzle is represented at S, through which water is caused to issue. This nozzle is sometimes termed a "giant," and water is carried by the pipe R from any suitable source, such as a pump or a head of water, to such washing-nozzle S, and the connection between the nozzle S and the water-pipe R is a ball or other joint that allows the nozzle to be raised or lowered and turned either to one side or the other side, and in a convenient position upon a platform P', nearly over the washing-hopper and trunk, an attendant is provided with a standing-place, by which he can operate the levers T, and from these levers chains 6 and 7 pass around suitable guiding sheaves or pulleys 8, 9, 10, 11, and 12 to the washing-nozzle S, and there is a cross-head S' upon this nozzle S, the ends of the chain 6 being connected with the same, so that the end of the nozzle can be swung around horizontal, or nearly so, to direct the water into any desired portion of the hopper G, or by the chain 7 the nozzle S can be raised or lowered, so as to further direct the water in its action upon the mass of gravel or similar material delivered by the steam-shovel into such hopper G.

It will be observed that by the levers T and chain connections to the washing-nozzle such nozzle can be raised to direct the water over the mass of material dumped into the hopper G, so as to wash such material away gradually from the bottom part of the mass of material at the side that is nearest to the cylinder N, or the nozzle may be directed upon any other portion of the mass of material to open up or separate the same and cause it to run down the trunk M into the cylinder N in whatever proportion to the water employed may be desired.

I prefer to place across the trunk M, and in the straight portion thereof, riffles L, with grooves or troughs between them for retaining the quicksilver or other amalgamating materials to detain and amalgamate the particles of gold that may subside between one riffle and the next, but inasmuch as the apparatus herein described is liable to sudden jars or to be tipped one way or the other there is a risk of the mercury in the troughs between the riffles running toward one end or even splashing out upon the other parts of the apparatus. To prevent this, I introduce the triangular stops 13, setting into the spaces between the riffles and at the desired distances apart, so as to hold the mercury or quicksilver and prevent it running to one end or the other of the riffle. Hence this device can be availed of for arresting and amalgamating any particles of gold that may be sufficiently free and pure to be taken up by the quicksilver. These stops are especially available in preventing the quicksilver running to either one end or the other of the grooves between the riffles, and hence the same cannot accumulate at either end or overflow or splash out and become lost.

The washing-cylinder N is of the ordinary character and is advantageously placed transversely upon the platform A, and the trunk M runs down and terminates as a bent tube entering the open receiving end of such washing-cylinder N and delivering the earthy materials and water into such cylinder, and it is supported upon rollers and revolved by suitable power, as usual, and the cylinder is usually made with longitudinal bars and openings between them, through which the sand and gravel and auriferous materials are washed and pass into the trough O, resting upon such platform A, and the larger pieces of material and stones are delivered from the opposite end of the washer into any suitable conveyers or buckets, and any suitable mechanism, such as a boiler and engine, can be employed for constantly rotating the washing-cylinder N. I, however, find it advantageous to place the engine and boiler at the rear portion of the platform A.

I provide a frame U' and hang in the same an amalgamator U, which amalgamator is intended to take the finer materials that may be washed from the cylinder N, and with this object in view a pump at W and an ascending pipe V are advantageously employed for taking the water and earthy materials from the trough or hopper O and conveying the same up into the amalgamator and discharging it upon the top inclined riffle-plate in the vertical ranges of amalgamators.

The chains 6 6 and 7 may be led to the nozzle S in any desired manner, but I find it preferable to pass the chains 6 6 and 7 down from the directing-levers T and around the pulleys 8 and 9 and around the double pulleys or block 10 to the pulleys 11 and 12, so as to put the movement of the nozzle S entirely under the control of one attendant, so that he can watch the washing apparatus and direct the current of water upon the mass of material in the hopper G, so as to cause the earthy materials to flow with reasonable uniformity into the washing-cylinder N.

I claim as my invention—

1. The combination with the car-truck and a steam-shovel pivotally mounted upon the truck, of an inclined hopper into which the earthy materials are deposited by the steam-shovel, a washing-cylinder and a sluice leading from the hopper to the washing-cylinder, a nozzle for water to wash the material down the sluice into the washing-cylinder, levers and connections to the nozzle, substantially as described, whereby the attendant can direct the water upon the earthy materials for regulating the flow of such earthy materials into the washing-cylinder, substantially as specified.

2. The combination with a rotary washing-cylinder, a car-truck supporting the same and means for adjusting and supporting the truck, of a frame, a pivotal connection for one end of the frame adjacent to the end of the axis of the washing-cylinder, a trunk and hopper supported by the frame, means for adjusting the frame and regulating the inclination of the hopper and trunk, a nozzle for issuing water and means for moving the nozzle to direct the jet of water upon the earthy materials, substantially as set forth.

3. The combination in an ore-separating apparatus, of a truck, means for adjusting and supporting the same, a steam-shovel pivoted upon the truck, an inclined hopper into which the mass of earthy materials is transferred by the steam-shovel, a revolving washing-cylinder, an inclined trunk and riffle-plate between the hopper and the revolving washing-cylinder, a movable water-supply nozzle and mechanism adapted to be controlled by the attendant for directing the water upon the mass of material in the hopper, and unifying the discharge of the earthy material over the riffle-plate and into the cylindrical washer, a hopper below such cylindrical washer, an amalgamator and means for suspending the same, and a pump for transferring the earthy material from the hopper of the cylindrical washer to the upper portion of the suspended amalgamator, substantially as set forth.

Signed by me this 6th day of July, 1896.

THOS. G. BARLOW-MASSICKS.

Witnesses:
S. M. BOBLETT,
E. M. ALBERTSON.